United States Patent
Mazanek et al.

(10) Patent No.: US 7,074,852 B2
(45) Date of Patent: Jul. 11, 2006

(54) BLOCKED POLYISOCYANATES

(75) Inventors: Jan Mazanek, Köln (DE); Christoph Thiebes, Köln (DE); Jürgen Meixner, Krefeld (DE); Olaf Fleck, Bergisch Gladbach (DE); Heino Müller, Leverkusen (DE)

(73) Assignee: Bayer MaterialScience AG, Levekrusen (DE)

( * ) Notice: Subject to any disclaimer, the term of this patent is extended or adjusted under 35 U.S.C. 154(b) by 20 days.

(21) Appl. No.: 10/874,988

(22) Filed: Jun. 23, 2004

(65) Prior Publication Data

US 2004/0266970 A1  Dec. 30, 2004

(30) Foreign Application Priority Data

Jun. 27, 2003  (DE) .................... 103 28 994

(51) Int. Cl.
- C08G 18/80 (2006.01)
- C08L 75/00 (2006.01)
- C09D 175/00 (2006.01)
- C08J 3/03 (2006.01)
- C07C 275/06 (2006.01)

(52) U.S. Cl. ............ 524/840; 252/182.2; 252/182.21; 252/182.22; 427/385.5; 427/388.1; 427/388.4; 427/389.7; 427/389.9; 427/393; 427/393.5; 427/393.6; 428/423.1; 428/425.1; 428/425.5; 428/425.6; 428/425.8; 524/591; 524/839; 528/45; 528/49; 528/71; 560/24; 560/25; 560/115; 560/157; 560/158

(58) Field of Classification Search ............ 252/182.2, 252/182.21, 182.22; 427/385.5, 388.1, 388.4, 427/389.7, 389.9, 393, 393.5, 393.6; 428/423.1, 428/425.1, 425.5, 425.6, 425.8; 524/591, 524/839, 840; 560/24, 25, 115, 157, 158; 564/32, 47, 57, 58, 61; 528/45, 49, 71

See application file for complete search history.

(56) References Cited

U.S. PATENT DOCUMENTS

| | | | |
|---|---|---|---|
| 4,173,567 A | * | 11/1979 | Findeisen et al. ............ 548/216 |
| 4,242,489 A | * | 12/1980 | Findeisen et al. ............ 528/73 |
| 4,247,689 A | * | 1/1981 | Findeisen et al. ............ 544/97 |
| 4,482,721 A | | 11/1984 | Wegner et al. .............. 548/262 |
| 4,495,229 A | * | 1/1985 | Wolf et al. ............... 427/388.2 |
| 4,757,113 A | | 7/1988 | Paar ........................... 525/124 |
| 4,976,837 A | | 12/1990 | Hughes et al. ............ 204/181.7 |
| 5,126,393 A | | 6/1992 | Blum et al. ................ 524/538 |
| 5,246,557 A | | 9/1993 | Hughes et al. ............ 204/181.4 |
| 5,294,665 A | | 3/1994 | Pedain et al. ................ 524/591 |
| 5,352,755 A | | 10/1994 | Hughes et al. ................ 528/45 |

(Continued)

FOREIGN PATENT DOCUMENTS

| | | | |
|---|---|---|---|
| CA | 1 187 083 | | 5/1985 |
| CA | 2253119 | * | 5/1999 |
| EP | 157 291 | | 7/1989 |

OTHER PUBLICATIONS

Progress in Organic Coatings, 36, 1999, pp. 148-172, Douglas A. Wicks, Zeno W. Wicks, Jr., "Blocked isocyanates III: Part A. Mechanisms and chemistry".

Progress in Organic Coatings, 9, 1981, pp. 3-28, Zeno W. Wicks, Jr., "New Developments in the Field of Blocked Isocyanates".

(Continued)

*Primary Examiner*—Rabon Sergent
(74) *Attorney, Agent, or Firm*—Joseph C. Gil; Thomas W. Roy

(57) ABSTRACT

Blocked polyisocyanates and one-component stoving systems containing these blocked polyisocyanates, and the preparation thereof and their use for the preparation of lacquers, paints, adhesives and elastomers. The blocked polyisocyanates are derived from polyisocyanates reacted with secondary amines and cationic, anionic and/or nonionic hydrophilizing agents such that they are incorporated into the polyisocyanate at a ratio of from 20:1 to 1:1, wherein the blocking agents correspond to the formula

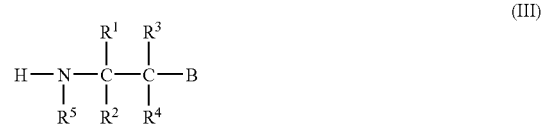

(III)

$R^1$–$R^4$ can be identical or different and independently of one another denote hydrogen, $C_1$–$C_6$-alkyl or $C_3$–$C_6$-cycloalkyl, $R^5$ denotes $C_1$–$C_{10}$-alkyl, $C_3$–$C_{10}$-cycloalkyl, and B represents

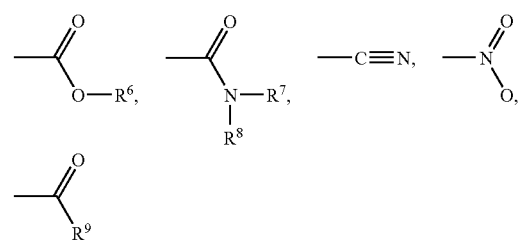

wherein $R^6$–$R^8$ can be identical or different and independently of one another denote $C_1$–$C_6$-alkyl and/or $C_1$–$C_6$-cycloalkyl, $R^9$ denotes hydrogen or $C_3$–$C_6$-alkyl or $C_3$–$C_6$-cycloalkyl.

20 Claims, No Drawings

U.S. PATENT DOCUMENTS

| | | | |
|---|---|---|---|
| 5,455,297 A | 10/1995 | Pedain et al. | 524/591 |
| 5,621,063 A | 4/1997 | Wolf et al. | 528/45 |
| 5,986,033 A | 11/1999 | Hughes et al. | 528/45 |
| 6,063,860 A | 5/2000 | Rimmer et al. | 524/590 |
| 6,368,669 B1 | 4/2002 | Hughes et al. | 427/385.5 |
| 6,784,243 B1* | 8/2004 | Rische et al. | 524/591 |
| 2003/0045631 A1* | 3/2003 | Konig et al. | 524/589 |
| 2003/0109627 A1* | 6/2003 | Baumbach et al. | 524/507 |

OTHER PUBLICATIONS

Progress in Organic Coatings, 3 1975, pp. 73-99, Zeno W. Wicks, Jr., "Blocked Isocyanates".

Houben-Weyl, Methoden der Organischen Chemie, vol. XIV/2, 1963, pp. 1-47, Dr. Erwin Müller, "Polycarbonsäureester".

* cited by examiner

BLOCKED POLYISOCYANATES

CROSS REFERENCE TO RELATED PATENT APPLICATION

The present patent application claims the right of priority under 35 U.S.C. §119 (a)–(d) of German Patent Application No.103 28 994.1, filed Jun. 27, 2003.

FIELD OF THE INVENTION

The invention relates to new blocked polyisocyanates and self-crosslinking one-component stoving systems and their use for the preparation of lacquers, paints, adhesives and elastomers.

BACKGROUND OF THE INVENTION

The use of blocking agents for temporary protection of isocyanate groups has been known for a long time. Blocked polyisocyanates are employed, inter alia, for the preparation of thermosetting 1C PU stoving systems which are stable to storage at room temperature. The blocked polyisocyanates are mixed here e.g. with polyesters containing hydroxyl groups, polyacrylates, other polymers and further constituents of lacquers and paints, such as pigments, co-solvents or additives. Self-crosslinking one-component stoving systems which contain, as binders, polymers which contain both blocked isocyanates and hydroxyl groups in one molecule are another form of stoving lacquers which are stable to storage at room temperature.

Overviews of the use of blocked polyisocyanates are to be found, for example, in Wicks, Z. Progress in Organic Coatings 3 (1975) 73–99, Wicks, Z. Progress in Organic Coatings 9 (1981) 3–28, D. A. Wicks and Z. W. Wicks, Progress in Organic Coatings, (1999), 148–172.

The most important compounds which are employed for blocking polyisocyanates are ε-caprolactam, methyl ethyl ketoxime (butanone oxime), malonic acid diethyl ester, secondary amines and triazole and pyrazole derivatives, such as are described e.g. in EP-A 0 576 952, EP-A 0 566 953, EP-A 0 159 117, U.S. Pat. No. 4,482,721, WO 97/12924 or EP-A 0 744 423.

Secondary amines are described as blocking agents in EP-A 0 096 210. However, only amines containing alkyl, cycloalkyl and aralkyl groups are mentioned expressly as blocking agents there. Amines which contain functional groups with carbon-heteroatom multiple bonds or heteroatom-heteroatom multiple bonds are not mentioned explicitly there.

The most frequently employed blocking agents for isocyanates are ε-caprolactam and butanone oxime. While as a rule stoving temperatures of about 160° C. are used in the case of ε-caprolactam, blocked 1C stoving lacquers in which butanone oxime has been employed as the blocking agent can already be stoved at temperatures 10 to 20° C. lower. Nevertheless, at these stoving temperatures the desired lacquer properties are no longer achieved in some lacquer systems. These temperatures, however, are meanwhile found to be too high, so that there is a need for stoving systems which crosslink completely at lower temperatures than when systems containing butanone oxime-blocked isocyanate crosslinking agents are employed.

The present invention was therefore based on the object of providing blocked polyisocyanates which have a lower crosslinking or stoving temperature than butanone oxime-blocked polyisocyanates.

SUMMARY OF THE INVENTION

The present invention is directed to blocked polyisocyanates according to formula (I)

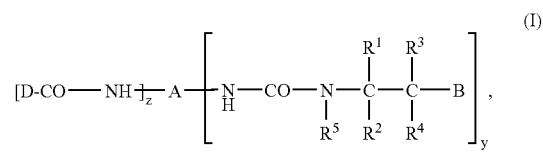

where
A denotes a radical of a polyisocyanate without the isocyanate groups,
B represents

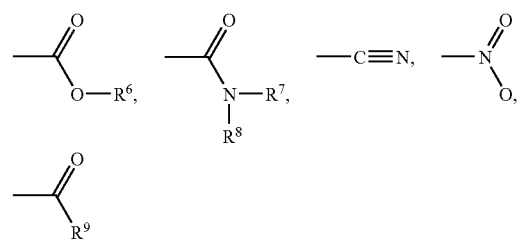

where $R^6$–$R^8$ can be identical or different and independently of one another denote $C_1$–$C_6$-alkyl and/or $C_1$–$C_6$-cycloalkyl, $R^9$ denotes hydrogen or $C_3$–$C_6$-alkyl or $C_3$–$C_6$-cycloalkyl,
D denotes the radical of a cationic, anionic and/or nonionic hydrophilizing agent,
$R^1$–$R^4$ can be identical or different and independently of one another denote hydrogen, $C_1$–$C_6$-alkyl or $C_3$–$C_6$-cycloalkyl,
$R^5$ denotes $C_1$–$C_{10}$-alkyl or $C_3$–$C_{10}$-cycloalkyl,
y denotes a number from 1 to 8 and
z denotes a number from 0.1 to 4, where the ratio of y to z is from 20:1 to 1:1.

The present invention is also directed to coating formulations that contain the above-described blocked polyisocyanates.

The present invention is further directed to a process for preparing the blocked polyisocyanates including:
reacting polyisocyanates of the general formula (II)

where A, y and z are as described above, with secondary amines of the general formula (III)

where $R^1$–$R^5$ and B are as described above, and hydrophilizing agents D-H, where D is as described above.

The present invention is additionally directed to a hydrophilized, aqueous and/or water-dilutable composition that includes the above described blocked obtained by reacting a) 100 equivalent % of polyisocyanate (II), b) 40–90 equivalent % of blocking agent (III), c) 10–40 equivalent % of hydrophilizing agent D-H and optionally d) 0–40 equivalent % of a preferably difunctional compound containing hydroxyl and/or amino groups and having an average molecular weight of 62 to 3,000, where the ratios of amounts of the reaction partners are chosen such that the equivalent ratio of NCO groups of component a) to groups of components b), c) and d) which are reactive towards isocyanates is 1:0.8 to 1:1.2.

DETAILED DESCRIPTION OF THE INVENTION

Other than in the operating examples, or where otherwise indicated, all numbers or expressions referring to quantities of ingredients, reaction conditions, etc. used in the specification and claims are to be understood as modified in all instances by the term "about."

This object of the invention has been achieved with the blocked polyisocyanates according to the invention and self-crosslinking one-component stoving systems containing these.

The present invention provides blocked polyisocyanates and self-crosslinking 1C stoving systems based on polyurethanes of the formula (I)

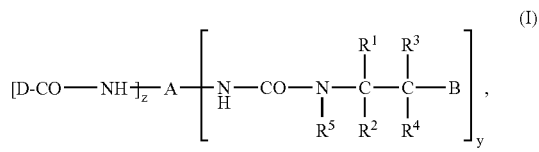

(I)

wherein

A denotes the radical of a polyisocyanate,

B represents

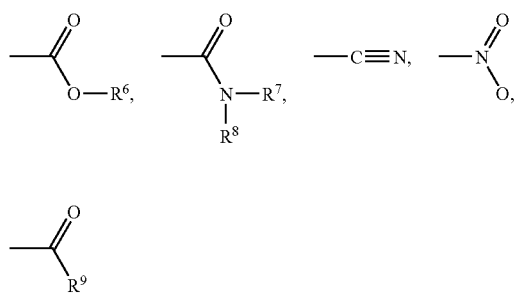

wherein $R^6$–$R^8$ can be identical or different and independently of one another denote $C_1$–$C_6$-alkyl and/or $C_1$–$C_6$-cycloalkyl, $R^9$ denotes hydrogen or $C_3$–$C_6$-alkyl or $C_3$–$C_6$-cycloalkyl, D denotes the radical of a cationic, anionic and/or non-ionic hydrophilizing agent, $R^1$–$R^4$ can be identical or different and independently of one another denote hydrogen, $C_1$–$C_6$-alkyl or $C_3$–$C_6$-cycloalkyl, $R^5$ denotes $C_1$–$C_{10}$-alkyl, $C_3$–$C_{10}$-cycloalkyl, y denotes a number from 1 to 8 and z denotes a number from 0.1 to 4, preferably 0.2 to 2, wherein the ratio of y to z is 20:1 to 1:1, preferably 10:3 to 3:1, particularly preferably 8:1 to 4:1.

The invention also provides a process for the preparation of the blocked polyisocyanates of the formula (I), characterized in that polyisocyanates with the general formula (II)

(II)

wherein A, y and z have the meaning given under formula I, are reacted with secondary amines of the general formula (III)

(III)

wherein $R^1$–$R^5$ and B have the meaning given in the case of formula (I), and hydrophilizing agents D-H.

The invention also provides the use of blocked polyisocyanates according to the invention for the preparation of lacquers, paints and other stoving systems, such as e.g. adhesives or elastomers, and as an additive in the vulcanization of rubbers, and furthermore objects of these materials and substrates coated with them.

The blocking agents of the formula (III) can be prepared, for example, by reaction of primary amines on compounds with activated carbon-carbon double bonds, such as are described, for example, in Organikum, 19th edition, Deutscher Verlag der Wissenschaften, Leipzig, 1993, pages 523 to 525. In this reaction, a primary amine reacts selectively with a carbon-carbon double bond to give a secondary, unsymmetric amine. Substances which can be interpreted as reaction products in the sense described above of sterically hindered primary alkylamines, such as, for example, sec-butylamine, tert-butylamine, optionally alkyl-substituted cyclohexylamine, iso-propylamine, cyclopropylamine, the branched or cyclic isomers of pentyl-, hexyl-, heptyl-, octyl- and nonylamine, benzylamine, and compounds with an activated carbon-carbon double bond, such as, for example, α,β-unsaturated carboxylic acid esters, α,β-unsaturated N,N-carboxylic acid dialkylamides, nitroalkenes, aldehydes and ketones, are preferably used as blocking agents of the formula (III). Substances which can be interpreted as addition products of primary amines on alkyl esters of acrylic, methacrylic and crotonic acid, such as methyl methacrylate, iso-norbornyl methacrylate, ethyl methacrylate, n-propyl methacrylate, iso-propyl methacrylate, n-butyl methacrylate, iso-butyl methacrylate, 2-ethylhexyl methacrylate, methyl acrylate, ethyl acrylate, n-propyl acrylate, iso-propyl acrylate, iso-norbornyl acrylate, n-butyl acrylate, tert-butyl acrylate, iso-butyl acrylate, 2-ethylhexyl acrylate, crotonic acid methyl ester, crotonic acid ethyl ester, crotonic acid propyl ester, are particularly preferably used.

Substances which can be interpreted as the addition product of tert-butylamine, diisopropylamine and/or cyclohexylamine on alkyl acrylates or alkyl methacrylates are preferably used. Products which can be prepared by addition of tert-butylamine on to methyl methacrylate or on to tert-butyl esters of acrylic or methacrylic acid are particularly preferred.

The preparation of the blocking agents can take place in a suitable, preferably polar solvent. The desired products can optionally be separated from the solvent and/or by-products by distillation or by extraction and then reacted with the polyisocyanates. However, it is also possible to carry out the reaction in a suitable lacquer solvent and to use the reaction mixture obtained directly for the preparation of the blocked polyisocyanates.

Blocking agents of the formula (III) which have been prepared by a route other than that described above, for example by transesterification of an ethyl ester of the formula (III) into a methyl ester, can of course also be used.

Blocking agents of the formula (III) can of course be used in any desired mixtures with one another. It is equally possible to employ the blocking agents according to the invention in any desired mixtures with other blocking agents of the prior art which are described above.

Polyisocyanates in the context of the invention which can be employed are all the known polyisocyanates based on aliphatic, cycloaliphatic and aromatic diisocyanates and having an isocyanate content of 0.5 to 50, preferably 3 to 30, particularly preferably 5 to 25 wt. %, e.g. those based on 1,4-diisocyanatobutane, 1,6-diisocyanatohexane (HDI), 2-methyl-1,5-diisocyanatopentane, 1,5-diisocyanato-2,2-dimethylpentane, 2,2,4- or 2,4,4-trimethyl-1,6-diisocyanatohexane, 1,10-diisocyanatodecane, 1,3- and 1,4-diisocyanatocyclohexane, 1,3- and 1,4-bis-(isocyanatomethyl)-cyclohexane, 1-isocyanato-3,3,5-trimethyl-5-isocyanatomethylcyclohexane (isophorone-diisocyanate, IPDI), 4,4'-diisocyanatodicyclohexylmethane, 1-isocyanato-1-methyl-4(3)isocyanato-methylcyclohexane (IMCI), bis-(isocyanatomethyl)-norbornane, 1,3- and 1,4-bis-(2-isocyanato-prop-2-yl)-benzene (TMXDI), 2,4- and 2,6-diisocyanatotoluene (TDI), diphenylmethane-2,4'- and/or -4,4'-diisocyanate (MDI) and products hydrogenated on the nucleus, 1,5-diisocyanatonaphthalene, 2,4'-, 4,4'-diisocyanatodiphenylmethane.

Polyisocyanates which contain heteroatoms in the radical containing the isocyanate groups are preferably suitable. Examples of these are polyisocyanates containing carbodiimide groups, allophanate groups, isocyanurate groups, iminooxadiazinetrione groups, urethane groups and biuret groups. According to the invention, the known polyisocyanates which are chiefly used in the preparation of lacquers are particularly suitable for use, e.g. modification products of the abovementioned simple diisocyanates, in particular hexamethylene-diisocyanate or isophorone-diisocyanate, 2,4'- and 4,4'-diisocyanatodicyclohexylmethane, containing allophanate, and/or biuret, and/or isocyanurate, uretdione groups and/or iminooxadiazinetrione groups. Low molecular weight polyisocyanates containing urethane groups, such as can be obtained by reaction of IPDI, MDI or TDI, employed in excess, with simple polyhydric alcohols of molecular weight range 62 to 300, in particular with trimethylolpropane or glycerol, are furthermore suitable.

Polyisocyanates with an isocyanurate, iminooxadiazinedione or biuret structure based on hexamethylene-diisocyanate (HDI), isophorone-diisocyanate (IPDI) and/or 4,4'-diisocyanatodicyclohexylmethane or mixtures of these compounds are particularly preferred.

Suitable polyisocyanates are furthermore the known prepolymers containing terminal isocyanate groups, such as are accessible, in particular, by reaction of the abovementioned simple polyisocyanates, preferably diisocyanates, with deficient amounts of organic compounds having at least two functional groups which are reactive towards isocyanates. In these known prepolymers, the ratio of isocyanate groups to hydrogen atoms which are reactive towards NCO corresponds to 1.05:1 to 20:1, preferably 1.3:1 to 3:1, the hydrogen atoms preferably originating from hydroxyl groups. The nature and ratios of amounts of the starting materials employed in the preparation of NCO prepolymers are preferably chosen such that the NCO prepolymers preferably have an average NCO functionality of 2 to 3 and a number-average molecular weight of 500 to 10,000, preferably 800 to 4,000. After preparation of the prepolymers it is possible to remove unreacted polyisocyanate, preferably by distillation.

The polyisocyanates mentioned can of course also be employed as mixtures with one another.

Polyisocyanates which are furthermore suitable in the context of the invention are those polymers which contain free isocyanate groups and are based on polyurethane, polyester and/or polyacrylate, and optionally mixtures thereof, and in which only some of the free isocyanate groups are reacted with the blocking agents according to the invention, while the remainder are reacted with an excess of polyesters, polyurethanes and/or polyacrylates, and optionally mixtures thereof, containing hydroxyl groups, so that a polymer containing free hydroxyl groups which crosslinks on heating to suitable stoving temperatures without the addition of further groups which are reactive with isocyanate groups is formed (self-crosslinking one-component stoving systems).

The preparation of the blocked polyisocyanates according to the invention can be carried out by methods known per se. For example, one or more polyisocyanates can be initially introduced into the reaction vessel and the blocking agent can be metered in (for example over a period of about 10 min), while stirring. The mixture is stirred until free isocyanate is no longer detectable. It is also possible to block one or more polyisocyanates with a mixture of two or more blocking agents.

A preparation in optionally water-miscible solvents, which are optionally removed again after the preparation, is of course also possible. However, it is also possible to prepare the polyisocyanates according to the invention in water-immiscible solvents and then to disperse these mixture in water or to dilute them with water-miscible solvents, such as acetone or N-methylpyrrolidone, to give water-miscible solutions. Catalysts, co-solvents and other auxiliary substances and additives can also be used in the preparation of the polyisocyanates according to the invention.

It is furthermore possible to react only some of the free NCO groups of diisocyanates with the blocking agents according to the invention and then to react some of the non-blocked NCO groups to form polyisocyanates built up from at least two diisocyanates.

An essential constituent of the preparation of the blocked polyisocyanates according to the invention is hydrophilization thereof, which leads to the polyisocyanates prepared in this way remaining in solution after addition of water or forming finely divided, sedimentation-stable dispersions.

Hydrophilizing agents which can be employed here are all the cationic, anionic and/or nonionic compounds suitable for this purpose, such as mono- and/or dihydroxycarboxylic acids or monofunctional alkyl ethoxylates. Mixtures of various hydrophilizing agents can also be employed.

The incorporation of the hydrophilizing agents into the polyisocyanates according to the invention can be carried out by processes known per se. Thus e.g. it is possible for some of the isocyanate groups first to be reacted with the blocking agents according to the invention and then for the remainder to be reacted with the hydrophilizing agent. However, the procedure can also be the reverse, or such that the blocking of the isocyanate groups takes place in two steps, namely before and after the hydrophilization.

The hydrophilizing agents can of course also be added at another point in time of the preparation of the polyisocyanates according to the invention, such as e.g. during the preparation of the prepolymers. Hydrophilized polyethers, polyesters and/or polyacrylates such as are used e.g. in the preparation of self-crosslinking one-component stoving lacquers can moreover also be employed as the hydrophilizing agent. Mixtures of hydrophilized and non-hydrophilized polyisocyanates can also be employed.

If mono- or dihydroxycarboxylic acids are employed for the hydrophilization, a complete or partial neutralization of the carboxyl groups is subsequently carried out. The neutralization can be carried out with any desired amines, such as triethyl-, dimethylcyclohexyl-, methyldiisopropyl- or dimethylethanolamine. Ammonia is also suitable.

The blocked polyisocyanates according to the invention are used as hydrophilized aqueous and/or water-dilutable blocked polyisocyanates as crosslinking agents preferably in a composition corresponding to a) 100 equivalent % of polyisocyanate (II)
b) 40–90, preferably 60–85 equivalent % of blocking agent (III) according to the invention
c) 10–40, preferably 10–30, particularly preferably 10–25 equivalent % of a hydrophilizing agent D and optionally
d) 0–40, preferably 5–25 equivalent % of a preferably difunctional compound containing hydroxyl and/or amino groups and having an average molecular weight of 62 to 3,000, preferably 62–1,500, the ratios of amounts of the reaction partners being chosen such that the equivalent ratio of NCO groups of component a) to groups of components b), c) and d) which are reactive towards isocyanates is 1:0.8 to 1:1.2, and optionally additives and auxiliary substances.

Possible difunctional chain-lengthening components c) are, for example, diamines, diols and also hydroxyamines in the molecular weight range from 32 to 300. Examples are hydrazine, ethylenediamine, isophoronediamine, the bisketimine from isophoronediamine and methyl isobutyl ketone, 1,4-dihydroxy-butane, 1,6-hexanediol, ethanolamine, N-methylethanolamine, hydroxyethylethylenediamine, the adduct of 2 mol of propylene carbonate and 1 mol of hydrazine of the formula (III).

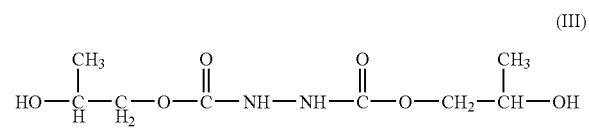

The aqueous and/or water-dilutable blocked polyisocyanates are either in the form of solutions in preferably water-miscible solvents, such as N-methylpyrrolidone, with a concentration of 40–95, preferably 60–85 wt. %, or in the form of finely divided dispersions with a solids content of 25–70, preferably 35–50 wt. %.

The blocked polyisocyanates according to the invention are used for the preparation of binders for lacquers, paints and other stoving systems, such as adhesives and elastomers, and as a crosslinking agent (component) for polyol components. These can be employed for coating substrates of any desired materials, such as e.g. metals, wood, mineral substances, concrete products, plastics, textiles, glass.

The polyisocyanates according to the invention are, as described above, self-crosslinking polymers and/or can also be used as crosslinking agents for polyol components. Possible polyol components, which can also be employed as mixtures, are polyhydroxy-polyesters, polyhydroxy-polyethers or polymers containing hydroxyl groups, e.g. the polyhydroxy-polyacrylates, which are known per se, with a hydroxyl number of 20 to 200, preferably 50 to 130, based on the 100% products, or polyhydroxy-polycarbonates or polyhydroxy-polyurethanes.

The polyhydroxy-polyacrylates are copolymers, which are known per se, of styrene with simple esters of acrylic acid and/or methacrylic acid, hydroxyalkyl esters, such as, for example, the 2-hydroxyethyl, 2-hydroxypropyl, 2-, 3- or 4-hydroxybutyl esters, of these acids being co-used for the purpose of introducing the hydroxyl groups.

Suitable polyether-polyols are the ethoxylation and/or propoxylation products, which are known per se from polyurethane chemistry, of suitable 2- to 4-functional starter molecules, such as e.g. water, ethylene glycol, propanediol, trimethylolpropane, glycerol and/or pentaerythritol.

Examples of suitable polyester-polyols are, in particular, the reaction products, which are known per se in polyurethane chemistry, of polyhydric alcohols, for example alkanepolyols of the type mentioned by way of example, with excess amounts of polycarboxylic acids or polycarboxylic acid anhydrides, in particular dicarboxylic acids or dicarboxylic acid anhydrides. Suitable polycarboxylic acids or polycarboxylic acid anhydrides are, for example, adipic acid, phthalic acid, isophthalic acid, phthalic anhydride, tetrahydrophthalic anhydride, hexahydrophthalic anhydride, maleic acid, maleic anhydride, Diels-Alder adducts thereof with cyclopentadiene, fumaric acid or dimeric or trimeric fatty acids. Any desired mixtures of the polyhydric alcohols mentioned by way of example or any desired mixtures of the acids or acid anhydrides mentioned by way of example can also be employed in the preparation of the polyester-polyols.

The preparation of the polyester-polyols is carried out by known methods, such as are described e.g. in Houben-Weyl, Methoden der organischen Chemie, volume XIV/2, G. Thieme-Verlag, 1963, pages 1 to 47. The hydrophilic modification of these polyhydroxy compounds which may be necessary is carried out by methods known per se, such as are described, for example, in EP-A-0 157 291 or EP-A-0 427 028.

Mixtures or reaction products based on polyesters, polyethers and polyacrylates, optionally also modified by polyurethanes of the known type, can of course also be employed.

The preparation of the lacquers, paints and other formulations using the polyisocyanates according to the invention is carried out by methods known per se. In addition to the polyisocyanates and polyols, conventional additives and other auxiliary substances (e.g. solvents, pigments, fillers, flow agents, defoamers, catalysts) can be added to the formulations in amounts which can easily be determined by the expert.

Further reactive compounds with NCO-reactive groups can also be employed as an additional crosslinking agent component. These are, for example, aminoplast resins. The condensation products, known in lacquer technology, of melamine and formaldehyde or urea and formaldehyde are to be regarded as aminoplast resins. All conventional melamine-formaldehyde condensates which are not etherified or are etherified with saturated monoalcohols having 1 to 4 C atoms are suitable. In the case of the co-use of other crosslinking agent components, the amount of binder with NCO-reactive hydroxyl groups must be adapted accordingly.

The blocked polyisocyanates according to the invention can be used for the preparation of stoving lacquers, e.g. for industrial lacquering and in first lacquering of automobiles.

For this, the coating compositions according to the invention can be applied by knife-coating, dipping, spray application, such as compressed air or airless spraying, and by electrostatic application, for example high speed rotary bell application. The dry film layer thickness here can be, for example, 10 to 120 μm. Curing of the dried films is carried out by stoving in temperature ranges from 90 to 160° C., preferably 110 to 140° C., particularly preferably at 120 to 130° C. The blocked polyisocyanates according to the invention can be employed for the preparation of stoving lacquers for continuous belt coating, it being possible for maximum stoving temperatures, known to the expert (in coating of metals) as peak (metal) temperatures, of between 130 and 300° C., preferably 190 to 260° C., and dry film layer thicknesses of, for example, 3 to 40 μm to be reached.

The following examples explain the invention in more detail, but without limiting it.

EXAMPLES

The percentage data are in per cent by weight, unless stated otherwise. The solids content and BNCO content are calculated parameters which are calculated as follows:

Solids content in %=[(total weight-total weight of solvent) divided by the total weight] multiplied by 100

BNCO content in %=[(eq. of blocked NCO groups multiplied by 42) divided by the total weight] multiplied by 100

The particle sizes were determined by laser correlation spectroscopy (LCS).

Example 1

Blocking Agent B1

86.09 g methyl acrylate were added, while stirring at room temperature, to 73.14 g tert-butylamine dissolved in 160.0 g methanol and the clear solution formed was stirred at room temperature for a further 16 h. The solvent was distilled off and 158.1 g of a product of the formula

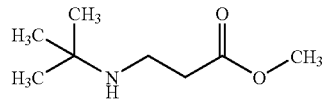

were obtained in a purity sufficient for further reaction to give the blocked polyisocyanate.

Example 2

Blocking Agent B2

100.1 g methyl methacrylate were added, while stirring at room temperature, to 95.09 g tert-butylamine dissolved in 175.0 g ethanol and the clear solution formed was stirred at 70° C. for a further 72 h. The readily volatile constituents were distilled off, the product phase was filtered and 165.7 g of a product of the formula

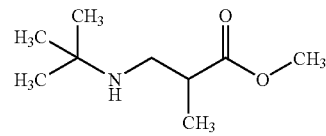

were obtained as the filtrate in a purity sufficient for further reaction to give the blocked polyisocyanate.

Example 3

Blocking Agent B3

128.1 g tert-butyl acrylate were added, while stirring at room temperature, to 73.14 g tert-butylamine dissolved in 200.0 g methanol and the clear solution formed was stirred at room temperature for a further 16 h. The solvent was distilled off and 199.1 g of a product of the formula

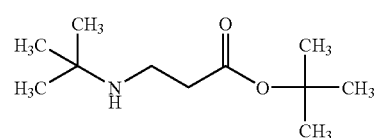

were obtained in a purity sufficient for further reaction to give the blocked polyisocyanate.

Example 4

Blocking Agent B4

86.09 g methyl acrylate were added, while stirring at room temperature, to 99.18 g cyclohexylamine dissolved in 185.0 g methanol and the clear solution formed was stirred at room temperature for a further 16 h. The solvent was distilled off and 184.2 g of a product of the formula

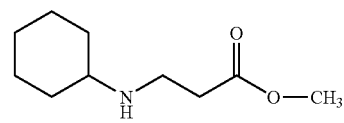

were obtained in a purity sufficient for further reaction to give the blocked polyisocyanate.

Example 5

Blocking Agent B5

100.1 g methyl methacrylate were added, while stirring at room temperature, to 59.0 g isopropylamine dissolved in 135.0 g methanol and the clear solution formed was stirred at room temperature for a further 12 h. The solvent was distilled off and 158.2 g of a product of the formula

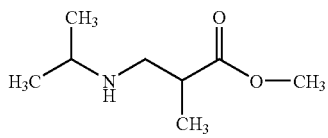

were obtained in a purity sufficient for further reaction to give the blocked polyisocyanate.

Example 6

Blocking Agent B6

100.1 g crotonic acid methyl ester were added, while stirring at room temperature, to 73.14 g tert-butylamine dissolved in 175.0 g ethanol and the clear solution formed was stirred at 70° C. for a further 72 h. The solvent was distilled off and 168.9 g of a product of the formula

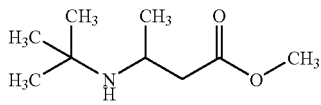

were obtained in a purity sufficient for further reaction to give the blocked polyisocyanate.

Example 7

(Preparation of a Water-Dilutable Polyisocyanate Crosslinking Agent)

58.80 g (0.297 eq.) of a commercially available isocyanurate-containing lacquer polyisocyanate based on 1,6-diisocyanatohexane (HDI) with an NCO content of 21.4 wt. %, a viscosity at 23° C. of approx. 3,000 mPas and a functionality of approx. 3.5, 7.08 g (0.06 mol) hydroxypivalic acid and 56.57 g N-methylpyrrolidone were mixed, while stirring, and the mixture was heated to 70° C. in the course of 30 minutes. It was stirred at this temperature for 2 hours and the temperature was then increased to 80° C. After a further 2 hours an NCO content of 7.60% was reached, the reaction mixture was cooled to 55° C. and 35.35 g (0.222 mol) of the compound from example 1 were added in the course of 15 minutes, the temperature rising to 55° C.

The mixture was subsequently stirred at 55° C. for 10 minutes and the completeness of the reaction was demonstrated by the IR spectrum. 5.35 g (0.06 mol) dimethylethanolamine were then added at 50° C. and the mixture was subsequently stirred for 10 minutes. A clear solution of the blocked polyisocyanate with a solids content of 66.6% and with content of blocked NCO groups of 5.69% was formed.

Example 8

(Preparation of an Aqueous Dispersion According to the Invention)

30.10 g (0.1879 mol) of the compound from example 1 were added in the course of 20 minutes, while stirring at room temperature, to 58.80 g (0.297 eq.) of a commercially available isocyanurate-containing lacquer polyisocyanate based on 1,6-diisocyanatohexane (HDI) with an NCO content of 21.4 wt. %, a viscosity at 23° C. of approx. 3,000 mPas and a functionality of approx. 3.5. During this the temperature rose to 50° C. and the NCO content of the reaction mixture reached 5.06% (theoret. 5.07%). The reaction mixture was heated up to 70° C., while stirring, and 1.61 g (0.0135 mol) 1,6-hexanediol and 6.42 g (0.054 mol) hydroxypivalic acid, the latter dissolved in 10.36 g N-methylpyrrolidone, were then added in succession in the course of 30 minutes in total. The mixture was stirred at 70° C. for a further 2 hours, and the NCO content reached 0.2%. 5.34 g (0.0594 mol) dimethylethanolamine were then added at 70° C. and the mixture was subsequently stirred for 15 minutes. 143.84 g deionized water, heated at 70° C., were then added and dispersing was carried out at 70° C. for 1 hour. A stable white dispersion with the following properties was formed:

| | |
|---|---|
| Solids content: | 40% |
| pH: | 8.98 |
| Viscosity (23° C.): | 10 mPas |
| Average particle size (LCS): | 138 nm |

Example 9

Preparation of an Aqueous Crosslinking Agent Dispersion According to the Invention 343.20 g (1.76 eq.) of a commercially available isocyanurate-containing lacquer polyisocyanate based on 1,6-diisocyanatohexane (HDI) with an NCO content of 21.4 wt. %, a viscosity at 23° C. of approx. 3,000 mPas and a functionality of approx. 3.5 were heated up to 70° C., while stirring, and 9.45 g (0.08 mol) 1,6-hexanediol were added in the course of 10 minutes. Thereafter, a solution of 37.76 g (0.32 eq.) hydroxypivalic acid in 60.93 g N-methylpyrrolidone was added in the course of 3 hours and the mixture was then subsequently stirred at 70° C. for 1 hour. The NCO content of the reaction mixture was then 11.56% (theoret. 11.91%). 198.73 g (1.25 mol) of the blocking agent from example 1 were then added at 70° C. in the course of 30 minutes and the mixture was subsequently stirred for 30 minutes. NCO was then no longer to be found by IR spectroscopy. 31.38 g (0.352 mol) dimethylethanolamine were added at 70° C. in the course of 10 minutes, the mixture was subsequently stirred for 10 minutes and 869.9 g deionized water, heated at 70° C., were then added, while stirring, and the mixture was subsequently stirred at 70° C. for 1 hour. After cooling to room temperature, while stirring, a dispersion with the following properties was obtained:

| | |
|---|---|
| Solids content: | 40% |
| pH: | 8.04 |
| Viscosity (23° C.): | 30 mPas |
| Average particle size (LCS): | 69 nm |

Example 10

Preparation of a Dispersion According to the Invention

The procedure was as described in example 9, but a 70% solution of the trimer of isophorone-diisocyanate in methoxypropyl acetate/xylene (Desmodur®Z 4400 M/X, Bayer AG) was used as the polyisocyanate. The dispersion obtained had the following properties:

| | |
|---|---|
| Solids content: | 40% |
| pH: | 9.12 |
| Viscosity (23° C.): | 60 mPas |
| Average particle size (LCS): | 105 nm |

Example 11

78.00 g (0.4 eq.) of a commercially available isocyanurate-containing lacquer polyisocyanate based on 1,6-diisocyanatohexane (HDI) with an NCO content of 21.4 wt. %, a viscosity at 23° C. of 3,000 mPas and a functionality of approx. 3.5 were initially introduced into the reaction vessel at 70° C., while stirring, and a solution of 4.72 g (0.04 mol) hydroxypivalic acid and 1.34 g (0.01 mol) dimethylolpropionic acid in 11.17 g N-methylpyrrolidone was added in the course of 5 minutes. After addition of 4.00 g (0.008 mol) Pluriol 500 (methyl oligoethylene glycol, MW 500) and 1.18 g (0.02 mol) 1,6-hexanediol, the mixture was stirred at 70° C. for 90 minutes. The NCO content was then 12.98% (theoret. 13.05%). 49.68 g (0.312 mol) of the compound from example 1 were added at 70° C. in the course of 20 minutes and the mixture was subsequently stirred at 70° C. for 15 minutes. No NCO groups were then to be detected by IR spectroscopy. 4.46 g (0.05 mol) dimethylethanolamine were added at 70° C., the mixture was subsequently stirred for 10 minutes and 205.79 g water, heated at 50° C., were then added. The mixture was subsequently stirred at 50° C. for 1 hour. The dispersion formed had the following properties:

| | |
|---|---|
| Solids content: | 40% |
| pH: | 9.30 |
| Viscosity (23° C.): | 1,800 mPas |
| Average particle size (LCS): | 73 nm |

Example 11a

The procedure was as described in example 9, but instead of the compound from example 1, the same molar amount of the compound from example 5 was employed. The dispersion obtained had the following properties:

| | |
|---|---|
| Solids content: | 40% |
| pH: | 8.60 |
| Viscosity (23° C.): | 170 mPas |
| Average particle size (LCS): | 148 nm |

Example 12

Comparison Example I

The procedure was as described in example 9, but butanone oxime was employed instead of the compound from example 1. The dispersion obtained had the following properties:

| | |
|---|---|
| Solids content: | 38% |
| pH: | 8.5 |
| Viscosity (23° C.): | 4,000 mPas |
| Average particle size (LCS): | 42 nm |

Example 13

(Preparation of a Self-Crosslinking One-Component Stoving System)

53.66 g (0.4 mol) dimethylolpropionic acid, dissolved in 106.80 g N-methylpyrrolidone, were added at 85° C., while stirring, to a mixture of 337.5 g (3.055 eq.) isophoronediisocyanate, 18.02 g (0.2 mol) 1,4-butanediol, 13.42 g (0.01 mol) trimethylolpropane, 22.5 g (0.045 mol) methanol ethoxylate of average molecular weight 500 and 205.80 g (0.49 eq.) of a polyester of adipic acid and hexanediol of average molecular weight 840 and the reaction mixture was stirred at this temperature for 4 hours. The NCO content was then 4.78% (theoret. 4.80%). 97.14 g (0.61 eq.) of the compound from example 1 were added in the course of 20 minutes. 318.18 g (1 eq.) of a polyester of adipic acid, isophthalic acid, trimethylolpropane, neopentylglycol and propylene glycol were then added and the reaction mixture was stirred at 85° C. for 10 hours. Thereafter, NCO groups were no longer to be detected by IR spectroscopy. 35.57 g (0.4 mol) dimethylethanolamine were then added and the mixture was subsequently stirred for 10 minutes. After addition of 1,525.5 g deionized water, heated at 70° C., dispersing was carried out at 70° C. for 1 h. The white dispersion obtained had the following properties:

| | |
|---|---|
| Solids content: | 45% |
| pH: | 8.35 |
| Viscosity (23° C.): | 580 mPas |
| Average particle size (LCS): | 40 nm |

Example 14

The procedure was as described in example 13, but instead of the blocking agent from example 1, the same molar amount of the compound from example 5 was employed. The dispersion obtained had the following properties:

| | |
|---|---|
| Solids content: | 45% |
| pH: | 8.12 |
| Viscosity (23° C.): | 1,800 mPas |
| Average particle size (LCS): | 63 nm |

Example 15 (Comparison Example)

The procedure was as described in example 13, but butanone oxime was employed instead of the blocking agent according to the invention. The dispersion obtained had the following properties:

| Solids content: | 40% |
| --- | --- |
| pH: | 8.60 |
| Viscosity (23° C.): | 3,800 mPas |
| Average particle size (LCS): | 51 nm |

Examples (Use Examples)

The following examples show the advantages of the blocked polyisocyanates according to the invention over the prior art.

Clear lacquers of the following composition were prepared. From the clear lacquers, films were produced, dried at room temperature for 10 minutes and then stoved at 140° C. for 30 minutes. The films obtained were evaluated for their properties during use. The results are summarized in table 1.

TABLE 1

(NCO: OH = 1.0)

| | Polyisocyanate from example no. | | | | | |
| --- | --- | --- | --- | --- | --- | --- |
| | 9 | 11a | 12 | 13 | 14 | 15 |
| Product (g) | | | | | | |
| Bayhydrol ® PT 241[1)] | 20.1 | 20.1 | 20.1 | — | — | — |
| Bayhydrol ® VP LS 2290 | 54.9 | 54.9 | 54.9 | — | — | — |
| Additol ® XW 395 df | 1.3 | 1.3 | 1.3 | 1.3 | 1.3 | 1.3 |
| Surbynol ® 104, 50% in NMP | 1.3 | 1.3 | 1.3 | 1.3 | 1.3 | 1.3 |
| Dist. water | 10.0 | 11.0 | 11.0 | 13.5 | 14.0 | 13.5 |
| Polyisocyanate | 101.8 | 102.5 | 82.3 | 164.5 | 164.5 | 164.5 |
| Property | | | | | | |
| Pendulum hardness (s) | 163 | 122 | 103 | 118 | 98 | 82 |
| Superficial solubility (1 min) | 2234 | 2344 | 3344 | 3444 | 3444 | 4455 |

[1)]Bayer AG, Leverkusen
df: delivery form

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. Blocked isocyanates according to formula (I)

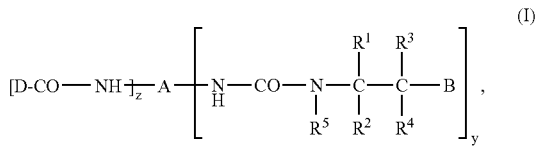

wherein

A denotes a radical of a polyisocyanate without the isocyanate groups,

B represents

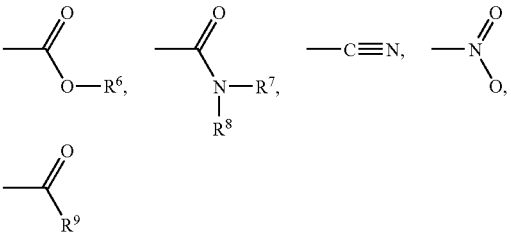

wherein $R^6$–$R^8$ are identical or different and independently of one another denote $C_1$–$C_6$-alkyl and/or $C_1$–$C_6$-cycloalkyl, $R^9$ denotes hydrogen or $C_3$–$C_6$-alkyl or $C_3$–$C_6$-cycloalkyl, D denotes the radical of a cationic, anionic and/or non-ionic hydrophilizing agent, $R^1$–$R^4$ are identical or different and independently of one another denote hydrogen, $C_1$–$C_6$-alkyl or $C_3$–$C_6$-cycloalkyl, $R^5$ denotes $C_1$–$C_{10}$-alkyl or $C_3$–$C_{10}$-cycloalkyl, y denotes a number from 1 to 8 and z denotes a number from 0.1 to 4, wherein the ratio of y to z is from 20:1 to 1:1.

2. The blocked isocyanates according to claim 1, wherein $R^5$ represents an amyl, isopropyl, isobutyl or tert-butyl radical.

3. The blocked isocyanates according to claim 1, wherein $R^1$ represents a methyl radical and $R^2$, $R^3$, $R^4$ represent a hydrogen atom.

4. The blocked isocyanates according to claim 1, wherein $R^3$ represents a methyl radical and $R^1$, $R^2$, $R^4$ represent a hydrogen atom.

5. The blocked isocyanates according to claim 1, wherein $R^1$, $R^2$, $R^3$ and $R^4$ represent a hydrogen atom.

6. The blocked isocyanates according to claim 1, wherein both blocked polyisocyanate groups and free hydroxyl groups are present in one molecule.

7. Coating formulations comprising blocked isocyanates according to claim 1.

8. Coating formulations according to claim 7 additionally comprising polyisocyanates blocked with diisopropylamine, butanone oxime and/or dimethylpyrazole.

9. Formulations according to claim 8, wherein the formulations are in the form of aqueous dispersions.

10. A process for preparing the blocked isocyanates of formula (I) according to claim 1 comprising:

reacting polyisocyanates of the general formula (II)

$$A\text{-}[\text{N}=\text{C}=\text{O}]_{y+z} \quad (II)$$

wherein A, y and z have the meaning given under formula I in claim 1, with secondary amines of the general formula (III)

$$\text{H}-\underset{\underset{R^5}{|}}{\overset{\overset{R^1}{|}}{\text{N}}}-\underset{\underset{R^2}{|}}{\overset{\overset{R^3}{|}}{\text{C}}}-\underset{\underset{R^4}{|}}{\overset{\phantom{|}}{\text{C}}}-\text{B} \quad (III)$$

wherein $R^1$–$R^5$ and B have the meaning given under formula (I) in claim 1, and hydrophilizing agents D-H, wherein D has the meaning given under formula (I) in claim 1.

11. A hydrophilized, aqueous and/or water-dilutable composition comprising the blocked isocyanates according to claim 1, obtained by reacting a) 100 equivalent % of polyisocyanates of the general formula (II)

  (II)

wherein A, y and z have the meaning given under formula I in claim 1, b) 40–90 equivalent % of with secondary amine blocking agents of the general formula (III)

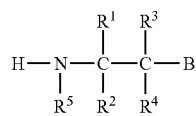  (III)

wherein $R^1$–$R^5$ and B have the meaning given under formula (I) in claim 1, c) 10–40 equivalent % of hydrophilizing agents D-H, wherein D has the meaning given under formula (I) in claim 1, and d) 0–40 equivalent % of a difunctional compound containing hydroxyl and/or amino groups and having an average molecular weight of from 62 to 3,000, wherein the ratios of amounts of the reaction partners are chosen such that the equivalent ratio of NCO groups of component a) to groups of components b), c) and d) which are reactive towards isocyanates is 1:0.8 to 1:1.2.

12. Lacquers, paints, adhesives and elastomers comprising the blocked isocyanates according to claim 1.

13. Lacquers, paints, adhesives and elastomers according to claim 12, wherein the lacquers, paints, adhesives or elastomers are stoving systems for coating substrates of wood, metals, concrete products, textiles, glass or plastics.

14. A process for coating substrates, comprising applying the coating formulations comprising blocked isocyanates according to claim 1 to a substrate and stoving the coating at a temperature of from 90 to 160° C.

15. The blocked isocyanates according to claim 1, wherein the ratio of y to z is from 10:3 to 3:1.

16. The blocked isocyanates according to claim 1, wherein the ratio of y to z is from 8:1 to 4:1.

17. The composition according to claim 11 further comprising one or more additives and auxiliary substances selected from the group consisting of solvents, pigments, fillers, flow agents, defoamers, and catalysts.

18. The process according to claim 14 including stoving at a peak temperature of from 130 to 300° C.

19. The blocked isocyanates according to claim 1, wherein z is from 0.2 to 2.

20. The composition according to claim 11, wherein the difunctional compound d) has an average molecular weight of from 62–1,500.

* * * * *